May 2, 1933.  H. D. CHURCH  1,906,537
INTERNAL COMBUSTION ENGINE
Filed March 17, 1930  2 Sheets-Sheet 1

INVENTOR
HAROLD D. CHURCH
BY RMCooper
ATTORNEY

May 2, 1933.  H. D. CHURCH  1,906,537
INTERNAL COMBUSTION ENGINE
Filed March 17, 1930   2 Sheets-Sheet 2

INVENTOR
HAROLD D. CHURCH
BY  RMCooper
ATTORNEY

Patented May 2, 1933

1,906,537

UNITED STATES PATENT OFFICE

HAROLD D. CHURCH, OF CLEVELAND, OHIO, ASSIGNOR TO THE WHITE MOTOR COMPANY, OF CLEVELAND, OHIO, A CORPORATION OF OHIO

INTERNAL COMBUSTION ENGINE

Application filed March 17, 1930. Serial No. 436,431.

This invention relates to internal combustion engines, and has for its object to effect certain improvements in the construction of internal combustion engines of the high compression type.

The invention contemplates a novel engine construction embodying an effective combination of well recognized detonation controlling features including compact combustion chambers having large surface to volume ratios, small clearance spaces superadjacent the pistons in communication with the combustion chambers, proper location of the ignition devices with respect to the exhaust valves and the combustion chambers, i. e., in the vicinity of the exhaust valves and in the central portion of the chambers, and an arrangement of parts which produces high turbulence of the mixture during the intake and compression periods.

Other objects and advantages will appear in the following description when read in connection with the accompanying drawings, in which—

Figure 1:
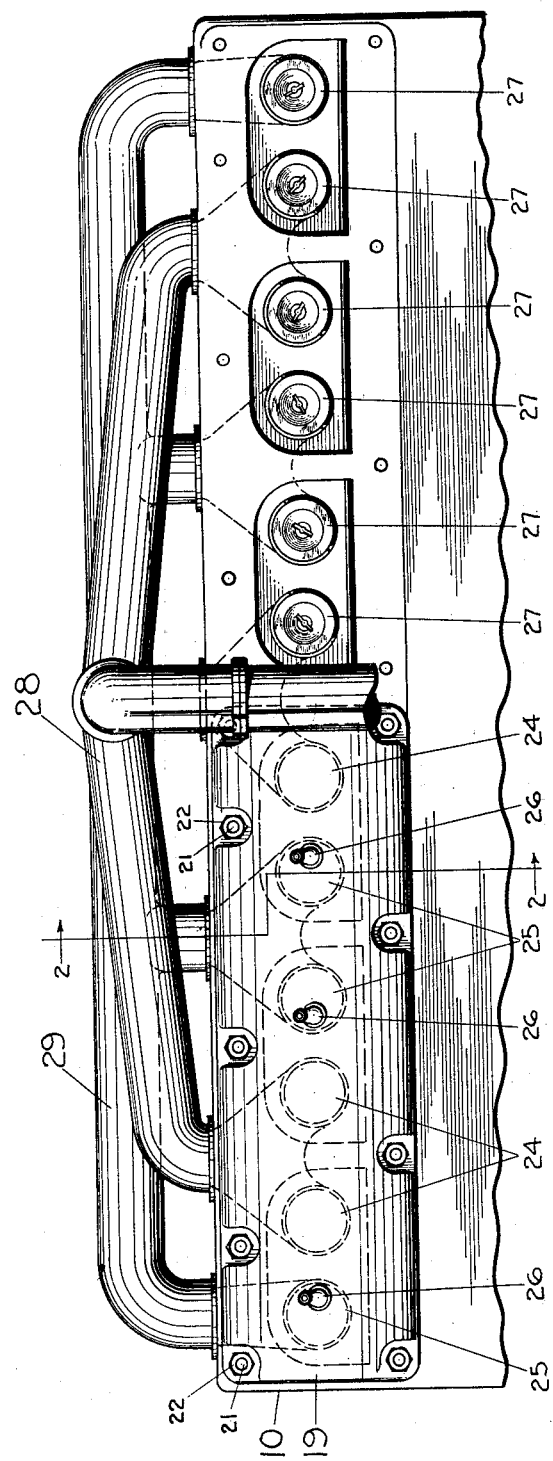
Figure 1 is a fragmentary side elevation of a four cycle gasoline engine embodying this invention, the right hand cylinder head cover plate being removed so as to show the interior of the combustion chambers.

Referring to the drawings, the engine therein illustrated comprises a cylinder block 10 in the cylinders 11 of which are mounted the usual pistons 12 operatively connected by means of connecting rods 13 to a crank shaft (not shown).

Figure 2:
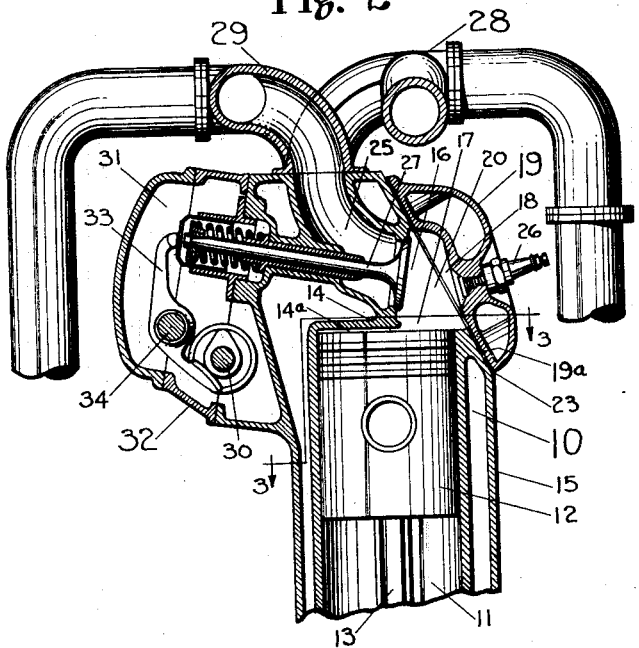
Figure 2 is a section taken on line 2—2 of Figure 1, the piston being shown at the upper end of its stroke.
Figure 3:
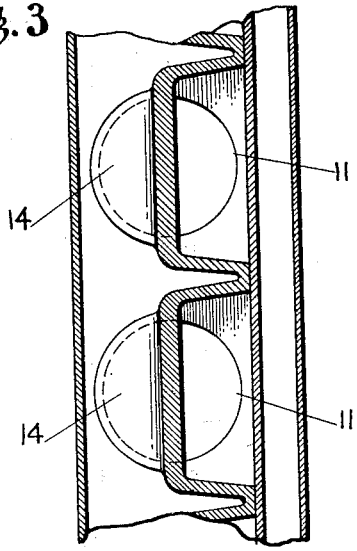
Figure 3 is a section taken on a line corresponding with line 3—3 of Figure 2.

As clearly shown in Figures 2 and 3 of the drawings, the block 10 is formed with lateral walls 14 which extend across and partially close the upper ends of the cylinders, and which are so located with respect to the piston, connecting rod, and crankshaft assembly that their lower surfaces are separated from the upper surfaces of the pistons 12 by small clearance spaces 14a when the pistons are at the upper ends of their strokes. The clearance spaces 14a may vary from about about one-fourth of an inch between surfaces to the smallest permissible mechanical clearance, depending upon the size and shape of the coordinated parts of the engine.

The block 10 is further formed with a water jacket 15, and a plurality of recesses 16 which communicate with the cylinders 11 through restricted openings 17 formed by the inner edges of the walls 14 and the opposite walls of the cylinders.

The recesses 16 join with complementary recesses 18 formed in a pair of cylinder head cover plates 19 to form the combustion chambers 20 of the engine. The cover plates 19 are secured to the side of the block 10 by means of studs 21 and nuts 22, and compressed between the machined surface 19a of each plate and the abutting machined surface of the block there is a gasket 23.

The combustion chambers 20 are each provided with an intake passage 24, an exhaust passage 25, and a spark plug 26. The inlet and exhaust passages 24 and 25 are controlled by poppet valves 27, and extend laterally and upwardly through the block 10 connecting the combustion chambers with an inlet manifold 28 and an exhaust manifold 29. The spark plugs are mounted in the cover plates 19 opposite the exhaust valves, and are connected to a conventional ignition system not shown.

The valves 27 are actuated by a cam shaft 30 driven from the engine crank shaft by means of a driving connection (not shown). The cam shaft 30 is journalled in the webs 31 of a casing 32 supported on the side of the block 10, and operates the valves 27 through the instrumentality of rocker arms 33 mounted on a shaft 34 supported in the webs 31 of the casing.

From the foregoing description, it will be seen that a high degree of turbulence will be created within the cylinders 11 during the intake period by the laterally directed streams of mixture emitted from the inlet passages 24, and that a higher degree of turbulence will be created within the combustion chambers 20 during the compression periods by the streams of mixture which are forced through the restricted openings 17.

The operation of the engine is the same as that of a conventional four cycle gasoline engine, except that detonation is controlled by the previously mentioned features, viz., compact combustion chambers, small clearance spaces superadjacent the pistons, proper location of the spark plugs, and an arrangement of parts producing high turbulence of the mixture during intake and compression periods.

Although the foregoing description is necessarily of a detailed character in order that the invention may be completely set forth, it is to be understood that the specific terminology is not intended to be restrictive or confining and that various rearrangements of parts and modification of structural details may be resorted to without departing from the spirit or scope of this invention.

I claim as my invention:—

1. In an internal combustion engine, the combination of a cylinder, a piston in said cylinder, a combustion chamber adjoining and communicating restrictively with one end of said cylinder, said cylinder being otherwise closed at its aforesaid end by a wall the inner surface of which lies closely adjacent the end of the piston when the piston is at the end of its compression stroke, inlet and outlet ports in one of the side walls of said chamber, and an ignition device mounted in the opposite side wall of said chamber.

2. In an internal combustion engine, the combination of a cylinder, a piston in said cylinder, a combustion chamber adjoining and communicating restrictively with one end of said cylinder at one side thereof, said cylinder being otherwise closed at its aforesaid end by a wall the inner surface of which lies closely adjacent the end of the piston when the piston is at the end of its compression stroke, an inlet port and an outlet port in one of the side walls of said chamber, and an ignition device mounted in the opposite side wall of said chamber opposite said exhaust port and in the central portion of said chamber.

3. In an internal combustion engine, the combination of a cylinder, a piston in said cylinder, a combustion chamber communicating with one end of said cylinder through an orifice having an area less than one-half the area of said cylinder, said cylinder being otherwise closed at its aforesaid end by a wall the inner surface of which lies closely adjacent the end of the piston when the piston is at the end of its compression stroke, inlet and outlet ports in one of the side walls of said chamber and an ignition device mounted in the opposite side wall of said chamber.

4. In an internal combustion engine, a plurality of aligned cylinders, pistons in said cylinders, combustion chambers for said cylinders disposed on one side of said cylinders in overlapping relation thereto, said combustion chambers extending beyond the sides of said cylinders by a distance less than the distance by which they overlap said cylinders, walls closing the ends of said cylinders except for the passages formed by the aforesaid overlapping combustion chambers, said walls being so located that their inner surfaces are separated from the ends of the pistons by small clearance spaces when the pistons are at the ends of their compression strokes, inlet and exhaust ports in the corresponding side walls of said chambers, and ignition devices in the opposite side walls of said chambers.

5. In an internal combustion engine, the combination of a cylinder, a piston in said cylinder, a combustion chamber of substantially rectangular cross section arranged to communicate restrictively with one end of said cylinder, said cylinder being otherwise closed at its aforesaid end by a wall, the inner surface of which lies closely adjacent the end of the piston when the piston is at the end of its compression stroke, inlet and outlet ports in one of the side walls of said chamber, and an ignition device mounted in the opposite side wall of said chamber.

6. In an internal combustion engine, the combination of a cylinder, a combustion chamber for said cylinder disposed at one side of said cylinder in overlapping relation thereto, said combustion chamber having a width substantially equal to the distance by which it overlaps the cylinder, and a length greater than that necessary to span the cylinder whereby pockets are formed at the ends of said combustion chamber, the design of said combustion chamber being such that it communicates with said cylinder through a restricted opening having an area substantially equal to one-half the cross sectional area of said cylinder, a wall enclosing the end of said cylinder except for the passage formed by the aforesaid overlapping combustion chamber, said wall being so located that its inner surface is separated from the end of the piston by a small clearance when the piston is at the end of its compression stroke, inlet and exhaust conduits leading into said combustion chamber, valves for controlling said inlet and exhaust conduits, and ignition means associated with said combustion chamber.

In testimony whereof I hereunto affix my signature this 4th day of March, 1930.

HAROLD D. CHURCH.